United States Patent [19]

Uebele et al.

[11] 3,721,724

[45] March 20, 1973

[54] RUBBER MODIFIED OLEFINIC NITRILE-VINYL AROMATIC-MALEIMIDE INTERPOLYMERS

[75] Inventors: Curtis E. Uebele, Bedford; Russell K. Griffith, Chagrin Falls; Irving Rosen, Painesville, all of Ohio

[73] Assignee: The Standard Oil Company, Cleveland, Ohio

[22] Filed: Sept. 22, 1970

[21] Appl. No.: 74,290

[52] U.S. Cl..260/880 R, 260/17.4 BB, 260/29.7 DP, 260/41.5 R, 260/78 UA
[51] Int. Cl..........C08f 19/08, C08f 1/13, C08f 5/00
[58] Field of Search..........................260/880, 78 UA

[56] References Cited

UNITED STATES PATENTS

| | | | |
|---|---|---|---|
| 3,322,853 | 5/1967 | Trementozzi | 260/879 |
| 3,549,725 | 12/1970 | Rose | 260/78 UA |

FOREIGN PATENTS OR APPLICATIONS

| | | | |
|---|---|---|---|
| 1,185,544 | 3/1970 | Great Britain | 260/78 UC |

*Primary Examiner*—James A. Seidleck
*Attorney*—John F. Jones and Sherman J. Kemmer

[57] ABSTRACT

Interpolymers having high impact strength, high softening temperature and other excellent properties result from the polymerization of an olefinic nitrile such as acrylonitrile, a vinyl aromatic monomer such as styrene, and maleimide in the presence of a conjugated diolefin elastomer.

8 Claims, 1 Drawing Figure

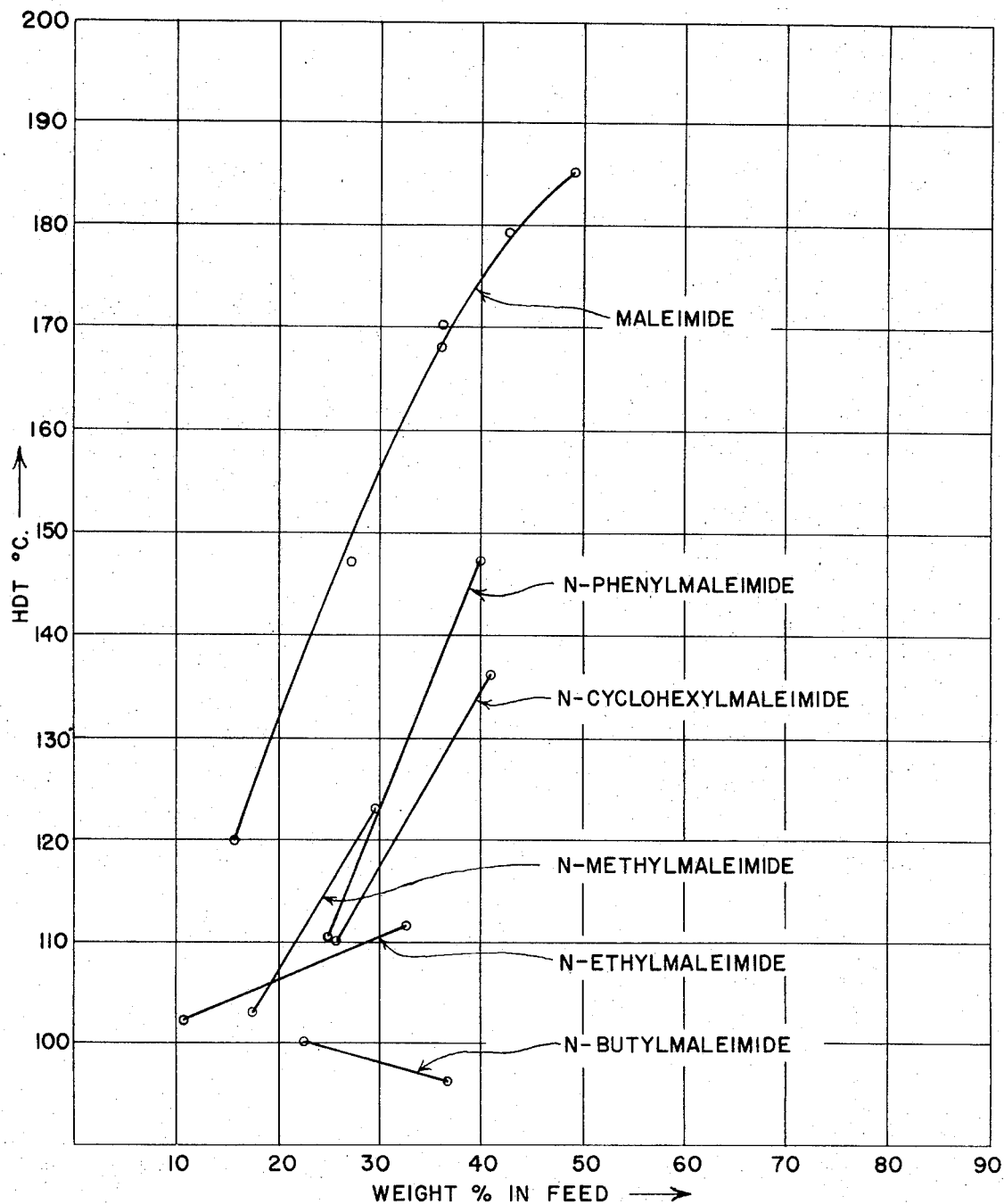

RUBBER MODIFIED OLEFINIC NITRILE-VINYL AROMATIC-MALEIMIDE INTERPOLYMERS

The present invention is concerned with high impact strength interpolymers of an olefinic nitrile monomer, a vinyl aromatic monomer and maleimide, and more particularly pertains to interpolymers having high impact strength, high softening temperature and other good physical properties resulting from the polymerization of an olefinic nitrile such as acrylonitrile, a vinyl aromatic monomer such as styrene, and maleimide in the presence of a conjugated diolefin elastomer.

The polymers of this invention have markedly superior physical properties in relationship to most prior art rubber-reinforced polymers.

The olefinically unsaturated nitrile monomers useful in the present invention are those having the structure

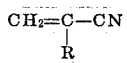

wherein R represents hydrogen, a lower alkyl group and a halogen, and more preferably wherein R is hydrogen or an alkyl group having from one to four carbon atoms. Preferred from this class for the purpose of this invention are acrylonitrile and methacrylonitrile and most preferred is acrylonitrile.

The vinyl aromatic monomers included herein are styrene and the alkyl- and halo-substituted styrenes. The alkyl-substituted styrenes include the nuclear and side-chain alkyl-substituted styrenes such as alpha-methyl styrene, alpha-ethyl styrene, the vinyl toluenes, the vinyl xylenes, the isopropyl styrenes, the t-butyl styrenes such as o-, m- and p-t-butyl styrenes, o-, m- and p-methyl, alpha-methyl styrenes, and the like, and mixtures of the same. The preferred vinyl aromatic monomer is styrene. Halogenated vinyl aromatic monomers useful in this invention include the nuclear halogenated vinyl aromatic monomers, such as the monochlorostyrenes, the dichlorostyrenes, the trichlorostyrenes, the tetrachlorostyrenes, pentachlorostyrene, the monobromostyrenes, the dibromostyrenes, the tribromostyrenes, the tetrabromostyrenes, the pentabromostyrenes, the chlorinated alpha-methyl styrenes, the brominated alpha-methyl styrenes, the chlorinated vinyl toluenes, the brominated vinyl toluenes, the chlorinated vinyl xylenes, the brominated vinyl xylenes, and the like. Most preferred of the halo vinyl aromatic monomers are the nuclear monochlorinated styrenes such as 2-chlorostyrene, 3-chlorostyrene, 4-chlorostyrene, and mixtures of two or more thereof.

Conjugated diolefin elastomers useful in the present invention include rubbery homopolymers and copolymers of conjugated dienes having from four to six carbon atoms. Such conjugated dienes include butadiene-1,3, isoprene, chloroprene, piperylene, cyanoprene, and the like; and one or more of these dienes can also be copolymerized with one or more comonomers including acrylonitrile, methacrylonitrile, styrene, alpha-methyl styrene, ethyl acrylate, and the like. Most preferred conjugated dienes are butadiene-1,3 and isoprene and most preferred comonomers for the elastomer are acrylonitrile, methacrylonitrile and styrene. The diene elastomers useful in this invention should contain 50 percent by weight or more of polymerized conjugated diene monomer.

Maleimide useful in this invention conforms to the structure

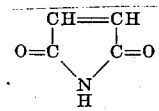

and is also sometimes called maleic imide and maleinimide.

The interpolymers most useful in the present invention are those which result from the polymerization of 100 parts by weight of nitrile, styrene and maleimide mixture in the presence of from about one to 25 parts by weight of the conjugated diolefin elastomer.

In the accompanying drawing, FIG. 1 illustrates the unobvious superiority of maleimide when used in the polymers of the instant invention as compared with various N-substituted maleimides many of which have been disclosed in the prior art. In FIG. 1 the ASTM heat distortion temperatures (HDT) for several polymers are plotted versus the weight percent of the particular maleimide in the polymerization monomer feed. The polymers given in FIG. 1 are all interpolymers of styrene, acrylonitrile, the maleimide shown and a polybutadiene as described in Examples 2–7 below.

The molar ratio of vinyl aromatic monomer to olefinic nitrile monomer can vary from 0.5 to 10 and correspondingly the molar ratio of maleimide to olefinic nitrile can vary from 0.2 to 2.5.

Copolymerization of the olefinic nitrile, vinyl aromatic and maleimide monomers in the presence of the rubber can be carried out by heating them in mass, in an inert solvent, in emulsion, or while dispersed as droplets in an inert medium, i.e., in suspension in water, and at a temperature in the range of about 0°C or below to about 100°C or above, and at atmospheric, subatmospheric or superatmospheric pressure, usually in the presence of a polymerization initiator or catalyst and in the substantial absence of oxygen. Preferred because of convenience in handling and recovery of product is an aqueous emulsion or suspension process in which the monomers are copolymerized in the presence of an aqueous emulsion or suspension of the preformed rubber.

Polymerization initiators or catalysts which may be used in the interpolymerization of the olefinically unsaturated nitrile, vinyl aromatic monomer and maleimide in the presence of the rubber include the per-acid catalysts such as persulfuric acid, peracetic acid and perphthalic acid; the per-salt catalysts such as potassium persulfate; the peroxide catalysts such as hydrogen peroxide, benzoyl peroxide, chlorobenzoyl peroxide, bromobenzoyl peroxide, naphthoyl peroxide, acetyl peroxide, benzoyl acetyl peroxide, lauryl peroxide, succinyl peroxide, di-t-butyl peroxide, dicumyl peroxide, cumyl hydroperoxide, t-butyl peracetate, sodium peroxide, and barium peroxide; t-alkyl hydroperoxides such as t-butyl hydroperoxide; azo catalysts such as azobisisobutyronitrile; and, if desired, mixtures of the polymerization initiators may be used. Radiation such as ultraviolet radiation, X-rays, nuclear radiation, etc., may also be used for the initiation of the polymerization.

The polymerization can be most advantageously carried out at a temperature in the range of from about 0°C to 100°C in the substantial absence of molecular oxygen.

The polymerization can be carried to completion without substantial interruption or it may be stopped at any point short of completion. Unreacted polymerizable material may be separated from the polymer by any suitable method such as filtration, extraction, distillation, and the like. The polymerization may be accomplished in any suitable type of apparatus and may be conducted in a batch, semi-continuous or continuous manner.

A particularly preferred method for the interpolymerization comprises an aqueous emulsion polymerization process wherein an aqueous emulsion of monomer is polymerized in admixture with an aqueous latex of the elastomer.

Emulsifying agents which may be used in the aqueous emulsion polymerization process include the soaps such as sodium and potassium myristate, laurate, palmitate, oleate, stearate, resinate and hydroabietate; alkali metal alkyl or alkylene sulfonates such as sodium and potassium lauryl sulfate, cetyl sulfate, oleyl sulfonate, stearyl sulfonate, sulfonated castor oil, as well as ammonium salts thereof; salts of higher amines such as lauryl amine hydrochloride and stearyl amine hydrobromide; and higher molecular weight materials such as sodium polyacrylate, methyl cellulose, polyvinyl pyrrolidone, etc.

Suitable molecular weight modifiers, such as the alkyl and aryl mercaptans including n-dodecyl mercaptan, t-dodecyl mercaptan, and the like may be employed in the polymerization in amounts of from about 0.01 percent to about 1.0 percent by weight based on the total weight of monomer material in the polymerization reaction.

The product of the aqueous emulsion polymerization is usually a latex. The interpolymers may be recovered from the latex by any suitable means such as by coagulation with electrolytes or solvents, by freezing, and the like.

Other modifiers, including plasticizers, stabilizers, lubricants, dyes, pigments, and fillers, may be added during the polymerization process provided they do not adversely affect the ingredients of the reaction mixture. Otherwise, these modifiers may be added following the polymerization. Examples of other modifying agents and pigments which may be added are wood flour, wood fibers, paper dust, clay, glass wool, glass fibers, mica, granite dust, silk flock, cotton flock, steel wool, cloth, sand, carbon black, titanium dioxide, zinc oxide, lead oxide, chrome yellow, gums, oils, waxes, and the like.

Other compounding ingredients, such as extenders, stabilizers, colors, and the like, may be used in preparing the compositions of this invention, as is well known in the art, so long as the balance between impact strength, flexural strength, tensile strength, processability, heat distortion temperature, and the like, is not affected to such a degree that the composition is no longer useful as a tough, rigid thermoplastic product.

The thermoplastic resins resulting from this invention possess high heat distortion temperatures, high tensile strengths, high flexural strengths, a high degree of hardness, high impact strengths, and low creep.

The compositions of this invention have excellent processing characteristics and they may be extruded, calendered, molded, drawn, embossed, machined, and otherwise treated to form useful, rigid, shock-resistant products and articles which have an excellent balance of good chemical, physical and electrical properties.

The thermoplastic resin compositions of this invention can be used to make all sorts of useful extruded or molded (injection or compression) shapes such as sheets, rods, tubes, and the like, as well as milled or calendered sheets or the like which can also be afterformed by Vacuum drawing or similar operations. They may be expanded by incorporating blowing agents and heating. Expanded and unexpanded sheets may be laminated. The compositions of this invention may be substituted to great advantage for the usual rubber of plastic compositions, or even for metals, wood or other materials, in many applications where toughness and resistance to creep and distortion at elevated temperatures are required. The resins are particularly useful in the production of articles and implements which must be subjected to relatively high heat for relatively long times such as medical instruments and the like. Thus, the present compositions may be used to fabricate parts for machines such as gears and cams; parts for textile machinery such as bobbins, shuttles, pickers, etc.; containers and pipes, especially for chemical and like operations, where resistance to corrosive substances is desired as in filter press plates and tumbling barrels for plating operations, electrical parts such as terminal blocks, telephones, and protective casings for cable joints; as well as tote boxes and trays, luggage, radio cabinets, furniture, phonograph records, signs, small boat hulls and decks, paneling or covering for walls and surfaces of buildings, railroad cars or ships; protective armor including body armor; automobile parts such as head liners, steering wheels, door panels and seat parts; roller skate wheels, protective helmets, packaging material for foods, drugs and cosmetics, printing plates, tools, die cutting blocks, washing machine parts such as covers, baskets, bearings and impellers; and numerous other articles as will be evident to those skilled in the art. The thermoplastic resinous compositions of this invention may be laminated or otherwise reinforced as with fibers, fabrics or wire mesh, if desired, in making useful articles therefrom, although usually the strength of these materials will be adequate without reinforcement.

In the following examples which will further illustrate this invention, the amounts of ingredients are given in parts by weight unless otherwise indicated.

Example 1

A. A polybutadiene rubber latex prepared by the emulsion polymerization of butadiene-1,3 at 122°F using a resin fatty acid soap emulsifier having a pH between 9.5–11 and a total solids content of 57.5–61 percent by weight was employed as the rubber latex in this example.

B. A mixture of styrene, acrylonitrile and maleimide monomers was polymerized in the presence of the polybutadiene latex described in A above. The following ingredients were used in the polymerization mixture:

|  | Parts |
|---|---|
| Styrene | 67.1 |

| | |
|---|---|
| Maleimide | 15.7 |
| Acrylonitrile | 17.2 |
| Rubber Latex A above | 15.0 (based on rubber solids) |
| Water | 700 |
| Sodium Lauryl Sulfate | 3.5 |
| Benzoyl Peroxide | 0.58 |

The polymerization was carried out in a polymerization reactor at about 70°C in a nitrogen atmosphere and with stirring. The polymerization reaction was carried out for about 22 hours.

At the end of the polymerization reaction the resulting resin from the polymer latex was coagulated by adding the latex to an excess of boiling isopropanol which contained a small amount of a saturated aqueous solution of $Al_2(SO_4)_3$. The coagulated resin was allowed to settle, part of the supernatant liquid was discarded, ice was added to the resin slurry to harden the particles, and the polymer was isolated by filtration. The polymer was then vacuum dried at 50° to 90°C. A 90 percent yield was obtained.

Compression molded bars were prepared from the resinous polymer by placing 10 grams of resin in a ½ × 5 inch steel mold and compressing the polymer at a temperature of 200° to 220°C under a hydraulic ram pressure of 8 to 10 tons for 6–8 minutes. The sample was then cooled to near room temperature under a ram pressure of 6 to 10 tons, the pressure was released, and the resulting molded bars were released from the mold and trimmed of flash material. The bars were subjected to physical testing and were found to have the following properties: ASTM Test No. 648 heat distortion temperature (264 psi) 133°C, Flexural strength 10,900 psi, Flexural modulus 289,000 psi, Tensile strength 6,390 psi, and notched Izod impact strength 1.28 foot pounds per inch of notch.

Example 2

A series of polymers were prepared according to the procedure of Example 1 in which the styrene:acrylonitrile ratio and amount of rubber were maintained but the amount of maleimide in the polymerization feed was varied. The effect of this variation of maleimide in the polymer on the ASTM heat distortion temperature (HDT) of the resulting resin is shown in FIG. 1 in the accompanying drawing. In FIG. 1 "Weight % in Feed" means weight percent of the designated monomer in the initial polymerization recipe in relation to the weight of the other monomers and excluding the weight of the rubber employed in the polymerization recipe.

EXAMPLE 3

Example 2 was repeated with the exception that N-phenylmaleimide was substituted for maleimide. The ASTM heat distortion temperature for these resins, which are outside the scope of the present invention, are given in FIG. 1. It was also observed that the yield of interpolymers prepared with N-phenylmaleimide according to this example were always considerably lower than for those prepared with maleimide, and the maleimide interpolymers were on the order of 1,000 times more resistant to hydrolysis than were the corresponding N-phenylmaleimide interpolymers.

EXAMPLE 4

Example 2 was repeated using N-cyclohexylmaleimide in place of maleimide. The effect of the amount of N-cyclohexylmaleimide on the ASTM heat distortion temperature of the resulting resins, which are outside the scope of the present invention, is given in FIG. 1.

EXAMPLE M5

Example 2 was repeated except that N-methylmaleimide was substituted for maleimide. The effect of the N-methylmaleimide level in the resins, which are outside the scope of the present invention, on the ASTM heat distortion temperature is shown in FIG. 1.

EXAMPLE 6

Example 2 was repeated except that N-ethylmaleimide was substituted for maleimide. The effect of the level of N-ethylmaleimide on the heat distortion temperature for these resins, which are outside the scope of the present invention, is given in FIG. 1.

EXAMPLE 7

Example 2 was repeated except that N-butylmaleimide was substituted for maleimide. The effect of the N-butylmaleimide level in the resins, which are outside the scope of the present invention, on the ASTM heat distortion temperature is given in FIG. 1.

EXAMPLE 8

Example 1 was repeated using a mole ratio of styrene:maleimide:acrylonitrile of 2:0.5:0.2 (77.6:18.4:4 parts by weight), respectively. The resulting resin was compression molded into test bars which were found to have the following physical properties: ASTM heat distortion temperature 139°C, Flexural strength 6,740 psi, Flexural modulus 262,000 psi, Tensile strength 5,400 psi and notched Izod impact strength 1.21 foot pounds per inch of notch.

EXAMPLE 9

Example 1 was repeated using a molar ratio of styrone:maleimide:acrylonitrile of 1:0.5:2 (40.3:19:40.7 parts by weight), respectively. The final resin was compression molded into test bars and was found to have the following physical properties: ASTM heat distortion temperature 127°C, Flexural strength 6,630 psi, Flexural modulus 176,000 psi, Tensile strength 3,940 psi and notched Izod impact strength 2.18 foot pounds per inch of notch.

EXAMPLE 10

Example 1 was repeated using a rubbery butadiene-styrene (75–25) copolymer latex with results similar to those reported in Example 1.

We claim:

1. The resinous polymer resulting from the polymerization of 100 parts by weight of
   A. an olefinically unsaturated nitrile monomer having the structure

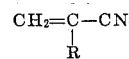

wherein R represents hydrogen, a lower alkyl group and a halogen, and

B. from 0.5 to 10 moles per mole of (A) of a vinyl aromatic monomer, and

C. from 0.2 to 2.5 moles per mole of (A) of maleimide, in the presence of from about one to 25 parts by weight of a conjugated diolefin elastomer composed of 50 percent or more by weight of a polymerized conjugated diene monomer selected from the group consisting of butadiene-1,3, isoprene, chloroprene, piperylene and cyanoprene and up to 50 percent by weight of one or more comonomers selected from the group consisting of acrylonitrile, methacrylonitrile, styrene, alpha-methyl styrene, and ethyl acrylate.

2. The composition of claim 1 wherein the nitrile monomer is acrylonitrile.

3. The composition of claim 2 wherein the vinyl aromatic monomer is styrene.

4. The composition of claim 3 wherein the conjugated diolefin elastomer is polybutadiene.

5. The process comprising polymerizing with a polymerization initiator in an aqueous emulsion with an emulsifying agent in the substantial absence of molecular oxygen at a temperature in the range of about 0°C to 100°C a mixture of 100 parts by weight of A. an olefinically unsaturated nitrile monomer having the structure

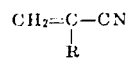

wherein R represents hydrogen, a lower alkyl group and a halogen, and

B. from 0.5 to 10 moles per mole of (A) of a vinyl aromatic monomer, and

C. from 0.2 to 2.5 moles per mole of (A) of maleimide, and from about 1 to 25 parts by weight of a conjugated diolefin elastomer composed of 50 percent or more by weight of a polymerized conjugated diene monomer selected from the group consisting of butadiene-1,3, isoprene, chloroprene, piperylene and cyanoprene and up to 50 percent by weight of one or more comonomers selected from the group consisting of acrylonitrile, methacrylonitrile, styrene, alpha!-methyl styrene, and ethyl acrylate.

6. The process of claim 5 wherein the nitrile monomer is acrylonitrile.

7. The process of claim 6 wherein the vinyl aromatic monomer is styrene.

8. The process of claim 7 wherein the conjugated diolefin elastomer is polybutadiene.

* * * * *